United States Patent [19]

Hughes et al.

[11] Patent Number: 5,314,532
[45] Date of Patent: May 24, 1994

[54] SOLUBLE SALT-FREE CONTAMINANT-FREE PIGMENTED MIRROR COATINGS

[75] Inventors: Zephuren J. Hughes, Alvarado; Ole G. Torgussen, Carrollton, both of Tex.

[73] Assignee: Sureguard, Inc., Grand Prairie, Tex.

[21] Appl. No.: 902,206

[22] Filed: Jun. 22, 1992
(Under 37 CFR 1.47)

Related U.S. Application Data

[63] Continuation-in-part of Ser. No. 754,898, Sep. 4, 1991, abandoned.

[51] Int. Cl.$^5$ .......................... C09D 5/08; C09D 7/12; C09D 191/00
[52] U.S. Cl. .................................. 106/253; 106/254; 106/256; 106/263; 106/419; 106/432; 106/480; 106/493; 106/14.24; 106/14.42; 524/195
[58] Field of Search ............... 106/253, 254, 256, 263, 106/449, 432, 480, 493, 14.24, 14.42; 524/195

[56] References Cited

U.S. PATENT DOCUMENTS

| | | | |
|---|---|---|---|
| 1,948,106 | 2/1934 | Franck | 423/368 |
| 3,039,848 | 6/1962 | Schaus | 423/368 |
| 3,846,148 | 11/1974 | Nordyke | 106/436 |
| 3,852,087 | 12/1974 | Nordyke | 106/436 |
| 4,707,405 | 11/1987 | Evans | 428/336 |
| 5,075,134 | 12/1991 | Sanford | 427/165 |
| 5,094,881 | 3/1992 | Sanford | 427/162 |

FOREIGN PATENT DOCUMENTS 905959 7/1960 United Kingdom .

*Primary Examiner*—David Brunsman
*Attorney, Agent, or Firm*—Lowe, Price, LeBlanc & Becker

[57] ABSTRACT

Soluble salt-free, contaminant-free antioxidant pigments which are cyanamide derivatives of metals, are provided in combination with organic resin polymers, as protective mirror backing coatings.

9 Claims, No Drawings

SOLUBLE SALT-FREE CONTAMINANT-FREE PIGMENTED MIRROR COATINGS

CROSS REFERENCE TO RELATED APPLICATIONS

This application is a continuation-in-part of application Ser. No. 07/754,898, filed Sep. 4, 1991, now abandoned.

FIELD OF THE INVENTION

This invention relates to improved hydrophilic stable coatings capable of protecting thin metallic films such as those on mirrors from corrosive decomposition. More particularly, the present invention relates to improved coatings for mirror backings which comprise combinations of organic resin polymers in aqueous or non-aqueous mediums and soluble salt and contaminant-free antioxidant scavenger pigments. Aqueous coatings (paint) for mirrors have not been available until the development of this invention. Accordingly, this invention provides aqueous coatings or paints as mirror backings.

BACKGROUND OF THE INVENTION

Mirrors are made by the successive application of various metals, preferably silver and copper films of between 800 angstroms and 1,500 angstroms in thickness on suitable substrates of glass or plastics such as polycarbonates, by wet chemical plating processes or vacuum metallizing, followed by a paint coating application, usually known as a mirror backing.

It is known that reflective silver layers on mirrors, even when protected by "backing" coatings are extremely sensitive to corrosive decomposition when exposed to moisture, contaminants in the atmosphere, salt, hydrogen sulfide, ammonia, and chlorides, which are present in domestic environments. It is also known that zinc phosphate or zinc salts of dicarboxylic acids, commonly applied as corrosion inhibitors in protective primers on steel or aluminum, contrary to expectations, do not work well in mirror backing coatings and actually exhibit corrosive action on the silver layer.

It can be stated that in the presence of moisture, numerous contaminants of airborne origin or ionic species generated "in situ" by pigments of inadequate quality (more specifically by soluble salt-contaminants, which usually accompany pigments of inadequate quality), which are functional components of the protective coating system, promote corrosion processes on mirrors Ag (silver) layer. Consequently, it can be concluded that due to the above mentioned extreme sensitivity to the corrosive action of ionic species, a mirror Ag (silver) layer is quite intolerant to quality variations of raw materials, more specifically of pigment components employed in "Mirror Backing" protective coatings.

Such quality variations of pigment grade products, typically those obtained by wet processes, are generally caused by the presence of trace amounts of soluble inorganic contaminants, usually water soluble by-products of the manufacturing procedures. A reduced specific surface area (reduced porosity) of solids, usually grades produced by various calcination procedures, is generally accountable for the reduced level of reactivity. Such reduced reactivity of pigment grade products (notably grades of basic mono-zinc cyanamide produced by calcination procedures) should also be considered quality variations intolerable in mirror backing applications designed for long term corrosion preventive protection. It is reasonable to suppose that the above mentioned intolerance of coating protected Ag (silver) mirrors, to the quality variations (specifically to the presence of the above mentioned soluble salt contaminants) of commercially available pigment grade products, is the reason why certain pigment grade zinc cyanamides have not gained acceptance in particular applications as in mirror backings as lead free alternatives to widely employed lead based pigments, and more specifically of lead cyanamide.

Various mirror backing coatings have been proposed by the prior art, including coatings which comprise mixtures of an organic resin and pigment. For example, U.S. Pat. No. 4,707,405 to Evans et al, discloses a mirror backing coating which comprises an organic film forming resin and a cyanamide salt of a non-lead metal. The cyanamide salt is said to be a salt of group IIA or group IIB metal such as calcium, zinc or magnesium, with the preferred salt being calcium cyanamide. It is believed that the calcium and magnesium cyanamides have not been successful because both are water soluble, highly alkaline "non-pigment" products which interfere in detrimental fashion with curing processes of coating systems organic material. In addition, they exhibit only marginal corrosion preventive activity on silver, which is expected considering that typical technical grade calcium cyanamides contain considerable amounts (e.g., 1% $CaS_2$) of soluble sulfide species as impurities. The zinc cyanamide mentioned above proved to be a basic mono cyanamide containing contaminants and inclusions of $ZnO$, $ZnCO_3$ and $SO$ which have prevented such cyanamides from performing satisfactorily under commercial conditions in mirror backings.

The present invention provides improved paint and coating formulations for mirror backings which provide excellent long term corrosion preventive protection of mirror reflective silver layer.

SUMMARY OF THE INVENTION

It is accordingly one object of the present invention to provide an improved paint or coating to protect thin metal films such as silver and copper against corrosive decomposition.

A further object of the present invention is to provide an improved mirror backing paint coating, including aqueous based coatings, which contain a salt-free and contaminant-free antioxidant pigment, and which is capable of protecting thin metallic films from chemical decomposition while exhibiting hydrolytic stability.

Other objects and advantages of the present invention will become apparent as the description thereof proceeds.

In satisfaction of the foregoing objects and advantages, there are provided by the present invention, protective mirror backing formulations which comprise the combination of a resin polymer contained in an aqueous or non-aqueous medium, and one or more refined neutral and/or acid antioxidant scavenger pigments, the pigment being essentially salt-free and essentially contaminant-free. The soluble salt-free, contaminant-free antioxidant scavenger pigment may be based on metals such as lead, zinc, nickel, cobalt, etc., and especially includes complexes of any of these metals with cyanamides and di-cyanamides.

Also provided by the present invention is a method for the protection of thin metal films contained on the backs of glass or plastic objects such as mirrors which comprises applying thereto an improved paint or coating which comprises a combination of an organic resin polymer contained in an aqueous or non-aqueous medium in combination with one or more soluble salt-free and contaminant-free antioxidants scavenger pigments.

DESCRIPTION OF PREFERRED EMBODIMENTS

According to the present invention, it has been discovered that the silver reflective layers of mirrors which contain protective coatings thereon have a marked intolerance to the presence of trace amounts of soluble salt contaminants which usually accompany the pigment component of the coating system. This is a particular problem with pigments which can generate ionic species disassociation in aqueous media. It has been discovered that the presence in trace amounts of these soluble salt contaminants is accountable for the poor corrosion preventive performance of some commercially available pigment grade products in mirror backing applications.

In the prior art, known manufacturing procedures provide pigments such as basic mono-zinc cyanamide by treating zinc oxide with an excess of urea or dicyanamide under nitrogen or vacuum, initially at 135° to 200° C. and then calcinating at 600°-800° C. for two hours. The shortcomings of this energy intensive procedure, are that it yields a product of relatively "closed" texture, characterized by low specific surface area and porosity, and consequently of reduced reactivity. Zinc cyanamide produced by calcination does not exhibit the high degree of corrosion preventive activity necessary in mirror backing systems, and thus, cannot be considered as "pigment" grade products for mirror applications.

Also known are wet manufacturing processes (U.S. No. 1,948,106 and 3,039,848) which produce basic mono zinc cyanamide by precipitation by reacting soluble zinc salts with water soluble, usually alkali, salts of hydrogen cyanamide, expressed as:

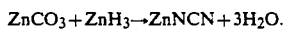
$ZnCO_3 + ZnH_3 \rightarrow ZnNCN + 3H_2O$.

The appearance in the system of the soluble by-products of the reaction is the major disadvantage of these procedures. To eliminate them, extensive washing is required whereby large amounts of contained waste water are generated. More importantly, due to the fact that complete elimination of the soluble salt contaminants are usually not feasible, the quality of pigment grade zinc cyanamide produced according to such procedures is affected by the presence of trace amounts of usually corrosion promoter soluble by-products.

It is also known from British Patent No. 905,959 (1962), and Russian Patent 327,783 that basic mono-zinc cyanamide may be produced by initially preparing an aqueous solution of hydrogen cyanamide by reacting dissolved calcium cyanamide with $H_2SO_4$ or $CO_2$ and subsequently reacting the intermediate product with a zinc oxide slurry at 20° C. for one to two hours. This reaction proceeds as follows:

$ZnO + H_2O + H_2NCN \rightarrow ZnNCN + 2H_2O$.

After filtering the product and drying, this product typically contains 83-85% of zinc cyanamide, 13-15% of zinc oxide, and 2% water. One of the shortcomings of this manufacturing procedure is related to the process for preparation of the hydrogen cyanamide. As a result, the final product contains considerable amounts of the carbonic acid and sulfuric acid in soluble form. Sulfur containing impurities, representing 1-2% of technical grade calcium carbides, the usual raw material of the calcium cyanamide manufacturing processes, are accountable for the appearance of soluble sulfide species in the hydrogen cyanamide. For obvious reasons, the applicability in mirror backing formulations of a pigment grade zinc cyanamide produced by this process is rather limited.

By this invention, salt-free and contaminant-free pigments are provided from which aqueous and non-aqueous mirror backing coatings are made possible, the coatings having outstanding anti-corrosion and durability properties and useful for long term protection. In the past, water soluble salts would create hydrophilic instability and incompatibility with the thin metallic films resulting in chemical decomposition and failure. The use of the salt-free and contaminant-free antioxidant pigment coatings of this invention offer additional performance features with respect to the chemical bonding of the coating and the substrate.

In this specification, the expression "salt-free" means that the pigment contains not more than about 0.5% by weight of water soluble free salts and impurities (contaminants) incompatible with thin silver/copper metallic films and the like. "Antioxidant" means a pigment or pigments which inhibit oxidation of the substrate or metal layer and prevents saponification of the coating. "Scavenger" means a pigment or pigments which effectively display the ability to neutralize free sulfide and chloride ions produced or present during the corrosion process.

There are various physical and chemical properties which any pigment must have in order to function as a corrosion preventive component in a paint and coating system, particularly in a protective coating. Thus, the pigment must have dispersability in organic media, either aqueous or non-aqueous, relatively low oil absorption, low water solubility, neutral or slightly alkaline hydrolysis in the absence of water soluble salts or inorganic contaminants, and more critically, the capacity to interact with and provide specific corrosion promoting electro-chemical processes which occur on the protective surface. This capacity of a pigment grade product derives from its chemical compositional structure. However, its corrosion retardant activity as manifested in protective coatings must be determined by its water solubility.

Soluble salt-free contaminant-free antioxidant scavenger pigments function as a corrosion preventive component of protective coatings as in mirror backing coatings due to the optimal water solubility and hydrolyzable pH. However, it is reasonable to suppose that the characteristics of the product in its hydrogen sulfide scavenger capacity and specifically the antioxidant nature of the cyanamide moiety, generated by solubilization during interaction of the pigment with corrosion promoting processes, are primarily accountable for the protective activity provided.

According to this invention, soluble salt-free and contaminant-free pigments are provided which enable the production of mirror backing compositions which exhibit durability and good appearance over long periods of time. According to this invention, soluble salt-free and contaminant-free metal cyanamide pigment suspensions are provided which are excellent quality pigments for mirror backings. The metal cyanamides are cyanamide salts or complex salts (neutral and/or acid) which include one or two or more metals in combination as well as mixtures and blends. The metal may be any metal of groups IIA and IIB of the Periodic Table, preferably lead, zinc, nickel, cobalt, or mixtures thereof.

Especially preferred materials are complex cyanamide salts which include two metal molecules complexed with hydrogen cyanamides including Neutral Mono-Zinc Cyanamide, Nickel Bis-Cyanamide, Cobalt Bis-Cyanamide, Zinc Nickel-Dicyanamide, Zinc Cobalt-Dicyanamide, and mixtures thereof, as well as equivalent materials.

Neutral Mono-Zinc Cyanamide is expressed as:

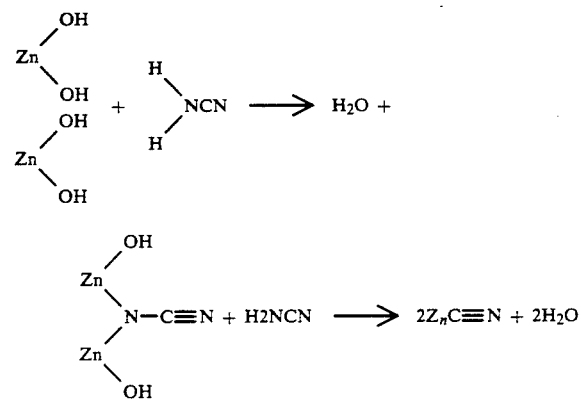

Acid Nickel Bis-Hydrogen Cyanamide

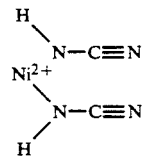

Acid Cobalt Bis Hydrogen Cyanamide

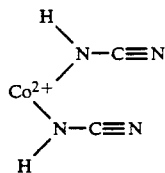

The salt free and contaminant free pigments of this type were obtained for use in this invention from Wayne Pigment Corporation, Milwaukee, Wis., USA and are available commercially.

| COMPARATIVE DATA FOR MONO-ZINC CYANAMIDE | | | |
|---|---|---|---|
| | WAYNE PIGMENT | B.P. #905959 | U.S. #1968106 |
| ZnNCN | 93-94% | 83-85% | 50% |
| ZnO | <1% | 13-15% | — |
| Zn CO3 | — | — | 50% |
| NCN Content | 37.0% | 19.5% | 18.5% |
| Neutral Zinc NCN | 100.0% | 69.0% | 50.0% |
| Basic Zinc NCN | 0 | 31% | U.K.* |

| -continued | | | |
|---|---|---|---|
| COMPARATIVE DATA FOR MONO-ZINC CYANAMIDE | | | |
| | WAYNE PIGMENT | B.P. #905959 | U.S. #1968106 |
| H2O | 5-6% | 2% | — |

*Contaminants Present

The organic compound of the mirror backing composition comprises any organic film forming resin which is either water soluble (aqueous) or solvent soluble (non-aqueous), or 100% solids. The organic film forming resin should be one which is compatible with the thin metallic film and will not promote deterioration and discoloration of the film. Thus, the resin should not contain functional groups which are reactive with the metal. Preferred organic film forming resins include alkyd resins, acrylic resins, acrylic modified alkyd resins, polyurethane oils, vinyl halide polymers or copolymers, epoxy resins, melamine resins, urea resins, non-oil based urethane, phenol-formaldehyde resins curable by air drying, baking, ultra violet curable, or any other resin which is compatible with the soluble salt contaminant-free antioxidant pigment. Suitable solvents for non-aqueous resins comprise various aromatics and aliphatic, hydrocarbons, alkyl esters, glycol ethers, and lower alkyl alcohols. Suitable solvents for aqueous resins comprise various glycol ethers, alkyl alcohols, and other water miscible solvents, all of which are known in the art.

A special feature of the invention is the provision of aqueous based coatings for mirrors as described herein. To Applicants' knowledge, such aqueous based mirror coatings have not been known heretofore.

In non-aqueous based systems, the components should be present in the following amounts:

| Component | Amount (wt. %) |
|---|---|
| Resin | 20-50 |
| Solvent | 10-40 |
| Pigment | 3-65 |

In aqueous based systems, the components should be present in the following amounts:

| Component | Amount (wt. %) |
|---|---|
| Resin | 10-45 |
| Solvent | 5-25 |
| Pigment | 3-65 |
| Water (preferably distilled) | 10-40 |

It is preferable that the soluble salt-free and contaminant-free antioxidant pigment be contained in the resin coating in the amount of about 3% to about 65%, preferably about 7% to 30% by weight of the composition based on pigment solids. It is also preferable that the pigment have a particle size of less than about 0.25 microns.

The composition can also contain other components or additives, such as driers, flow control aids, anti-settling agents, dispersing aids, and the like, and mixtures thereof.

The process of the invention for use of the coating comprises applying the composition of the coating comprises applying the composition of the invention to a thin metallic film, preferably such film on a glass substrate such as a mirror. The composition of the invention can be applied to the thin metallic film by any conventional method such as coating, roll coating, curtain coating, or spraying. The composition is preferably applied to the thin metallic film in a thickness of about 0.5 mil to about 3.5 mils. The composition is cured on the mirror by simply air drying, force heat drying or baking.

The following examples are presented to illustrate the invention but the invention is not to be considered as limited thereto. In the examples, parts are by weight unless otherwise indicated.

EXAMPLE I

The following pigments were obtained from Wayne Pigment Corp.

| NEUTRAL MONO-ZINC CYANAMIDE | |
| --- | --- |
| % Zinc as Zn | 57.7–58.3 |
| % N as N | 24.7–24.9 |
| % Zinc Cyanamide | 93.0–94.0 |
| % Crystal Water | 05.0–06.0 |
| COBALT BIS-HYDROGEN CYANAMIDE | |
| % Cobalt as Co | 39.9–40.3 |
| % N as N | 37.0–37.4 |
| % Co Bis-Hydrogen Cyanamide | 93.1–94.1 |
| NICKEL BIS-HYDROGEN CYANAMIDE | |
| % Nickel as Ni | 38.3–38.6 |
| % N as N | 36.2–36.4 |
| % Ni Bis-Hydrogen Cyanamide | 91.1–91.6 |
| Zinc-Nickel Dicyanamide | |
| % Zinc as Zn | 51.2–51.8 |
| % Nickel as Ni | 4.3–4.5 |
| % N as N | 25.9–26.9 |
| % Cyanamide as NCN | 92.7–93.7 |
| % Crystal Water | 4.4–5.4 |
| Zinc-Cobalt Dicyanamide | |
| % Zinc as Zn | 49.6–49.9 |
| % Cobalt as Co | 5.6–5.9 |
| % N as N | 26.4–27.4 |
| % Cyanamide as NCN | 93.0–94.0 |
| % Crystal Water | 4.3–5.3 |

EXAMPLE II

Preparation of Mirror Backing Coating Formulations

A Mirror Backing Paint Formulation is prepared by mixing a soluble salt contaminant-free cyanamide pigment as described below, obtained from Wayne Pigment Corp., with a resin or resins as listed in the following tables. The initial dispersion mirror backing coating formula is ground to 6+ns Hegman and, allowed to stand overnight at room temperature. The non-aqueous material is reduced with solvent (Xylol) and the aqueous material reduced with D.I. water to applied viscosity of 35 seconds on a Number 3 G.E. Zahn Cup, and subsequently drawn down on pre-metallized (silver/copper) 12×12 inch, ¼ inch glass mirror panels with a 3 mil Bird draw down path bar and allowed to flash dry for two minutes at room temperature. The coating is then baked for four minutes at 350° F. to yield 1.5 dry film mils, then the mirror is aged 24 hours after which 3 inches is cut and removed from all four edges leaving a 6×6 inch panel for testing. The cut panels are then placed in a Salt Spray cabinet at 45 degree angles, exposed to 100% humidity and a 20% salt solution at 95° F. and evaluated every 150 hours of exposure for a total for 300 hours. The panel edges are evaluated for degree of edge creep (metal decomposition/discoloration) expressed in millimeters. The face of the mirror is also evaluated for field spotting, pin holes, hazing, and metal decomposition.

The following table sets forth both aqueous and non-aqueous paint/coating formulations as mirror backing compositions of this invention. In the following tables, the zinc cyanamide pigment is a neutral zinc cyanamide pigment.

EXAMPLE I

TABLE I

TYPICAL PAINT/COATING, IE. MIRROR BACKING FORMULATIONS ARE MADE UP OF THE FOLLOWING COMPONENTS:

| A) NON-AQUEOUS MIRROR BACKING FORMULATIONS | | | | | | | |
| --- | --- | --- | --- | --- | --- | --- | --- |
| COMPONENTS | 1A | 2A | 3A | 4A | 5A | 6A | 7A |
| 1. MEDIUM OIL LINSEED ALKYD | 40.00 | 40.00 | 40.00 | 40.00 | 40.00 | 40.00 | 40.00 |
| 2. PHENOLIC RESIN | 4.00 | 4.00 | 4.00 | 4.00 | 4.00 | 4.00 | 4.00 |
| 3. TALC | 17.50 | 21.50 | 21.50 | 18.50 | 18.50 | 21.50 | 25.00 |
| 4. PIGMENT | 10.00 | 10.00 | 10.00 | 10.00 | 10.00 | 10.00 | 10.00 |
| METHYLETHYL KETOXINE | 0.20 | 0.20 | 0.20 | 0.20 | 0.20 | 0.20 | 0.20 |
| 12% COBALT OCTOATE DRIER | 0.20 | 0.20 | 0.20 | 0.20 | 0.20 | 0.20 | 0.20 |
| 10% CALCIUM OCTOATE DRIER | 0.40 | 0.40 | 0.40 | 0.40 | 0.40 | 0.40 | 0.40 |
| XYLENE | 18.70 | 18.70 | 18.70 | 18.70 | 18.70 | 18.70 | 18.70 |
| 5. ZINC CYANAMIDE PIGMENT | 9.00 | — | — | — | — | — | — |
| 6. NICKEL BIS CYANAMIDE PIGMENT | — | 5.00 | — | — | — | — | — |
| 7. COBALT BIS CYANAMIDE PIGMENT | — | — | 5.00 | — | — | — | — |
| 8. ZINC NICKEL DICYANAMIDE PIGMENT | — | — | — | 8.00 | — | — | — |
| 9. ZINC COBALT DICYANAMIDE PIGMENT | — | — | — | — | 8.00 | — | — |
| 10. LEAD ZINC CYANAMIDE PIGMENT | — | — | — | — | — | 5.00 | — |
| CONTROL | | | | | | | 0.00 |
| TOTALS | 100.0 | 100.0 | 100.0 | 100.0 | 100.0 | 100.0 | 100.0 |

| B) AQUEOUS MIRROR BACKING FORMULATIONS | | | | | | | |
| --- | --- | --- | --- | --- | --- | --- | --- |
| COMPONENTS | 1B | 2B | 3B | 4B | 5B | 6B | 7B |
| 1. WATER SOLUBLE ACRYLIC RESIN | 30.00 | 33.60 | 33.60 | 30.00 | 30.00 | 30.00 | 33.60 |
| TRIETHYLAMINE (TEA) | 2.00 | 2.00 | 2.00 | 2.00 | 2.00 | 2.00 | 2.00 |
| 2. TALC | 6.00 | 5.00 | 5.00 | 7.00 | 7.00 | 10.00 | 10.00 |
| 3. PIGMENT | 10.00 | 10.00 | 10.00 | 10.00 | 10.00 | 10.00 | 10.00 |
| ETHYLENE GLYCOL MONOBUTYL ETHER | 6.50 | 6.50 | 6.50 | 6.50 | 6.50 | 6.50 | 6.50 |
| BUTYL ALCOHOL | 2.50 | 2.50 | 2.50 | 2.50 | 2.50 | 2.50 | 2.50 |
| 4. MELAMINE RESIN | 10.00 | 11.20 | 11.20 | 10.00 | 10.00 | 10.00 | 11.20 |
| DI-WATER | 24.00 | 24.20 | 24.20 | 24.00 | 24.00 | 24.00 | 24.20 |

TABLE I-continued

| TYPICAL PAINT/COATING, IE. MIRROR BACKING FORMULATIONS ARE MADE UP OF THE FOLLOWING COMPONENTS: | | | | | | | |
|---|---|---|---|---|---|---|---|
| 5. ZINC CYANAMIDE PIGMENT | 9.00 | — | — | — | — | — | — |
| 6. NICKEL BIS CYANAMIDE PIGMENT | — | 5.00 | — | — | — | — | — |
| 7. COBALT BIS CYANAMIDE PIGMENT | — | — | 5.00 | — | — | — | — |
| 8. ZINC NICKEL DICYANAMIDE PIGMENT | — | — | — | 8.00 | — | — | — |
| 9. ZINC COBALT DICYANAMIDE PIGMENT | — | — | — | — | 8.00 | — | — |
| 10. LEAD ZINC CYANAMIDE PIGMENT | — | — | — | — | — | 5.00 | — |
| CONTROL | | | | | | | 0.00 |
| TOTALS | 100.0 | 100.0 | 100.0 | 100.0 | 100.0 | 100.0 | 100.0 |

TABLE II

| SALT SPRAY TEST RESULTS | | | | | | | |
|---|---|---|---|---|---|---|---|
| TABLE I | 1A | 2A | 3A | 4A | 5A | 6A | 7A |
| 150 HRS./EDGE CREEP | .5 mm | .1 mm | .1 mm | 0 mm | 0 mm | 0 mm | 7 mm |
| 150 HRS./FIELD AREA/SPOTS | Pass | Pass | Pass | Pass | Pass | Pass | Fail |
| 300 HRS./EDGE CREEP | 1 mm | .5 mm | .40 mm | .5 mm | .40 mm | 0 mm | 10 mm |
| 300 HRS./FIELD AREA/SPOTS | Pass | Pass | Pass | Pass | Pass | Pass | Fail |
| TABLE I | 1B | 2B | 3B | 4B | 5B | 6B | 7B |
| 150 HRS./EDGE CREEP | .5 mm | 1 mm | 1 mm | .5 mm | .5 mm | .5 mm | 15 mm |
| 150 HRS./FIELD AREA/SPOTS | Pass | Pass | Pass | Pass | Pass | Pass | Fail |
| 300 HRS./EDGE CREEP | 2.0 mm | 2.5 mm | 2.0 mm | 1 mm | .90 mm | .5 mm | 23 mm |
| 300 HRS./FIELD AREA/SPOTS | Pass | Pass | Pass | Pass | Pass | Pass | Fail |

The following notes explain the components of the compositions of Table I.

A) Non-Aqueous: 1) Medium Oil Linseed Alkyd; NVW 50% Solvent Xylol, Acid No. 12; 2) Phenolic Resin; NVW 100%, CKM-2400, Union Carbide; 3) Talc; NVW 100%, Microfine magnesium silicate compatible with metals; 4) Pigment; NVW 100%, 96.0% Titanium Dioxide, 4.0% Carbon Black compatible with metals; 5) Zinc Cyanamide NVW 100%, Soluble Salt Contaminant-Free, Wayne Pigments; 6) Nickel Cyanamide NVW 100% Soluble Salt Contaminant-Free; Wayne Pigments; 7) Cobalt Bis-cyanamide NVW 100% Salt-Free, Wayne Pigments; 8) Zinc Nickel Dicyanamide NWV 100%; Soluble Salt Contaminant-Free, Wayne Pigments; 9) Zinc Cobalt Dicyanamide NVW 100%; Soluble Salt Contaminant-Free; Wayne Pigments; 10) 33.5% Lead Cyanamide; 66.5% Zinc Cyanamide; Soluble Salt Contaminant-Free; Wayne Pigments.

B) Aqueous: 1) Water Soluble Acrylic Resin; NVW 70%; Solvent, 2-butoxyethanol, compatible with metals, Soluble Salt Contaminant-Free; Wayne Pigments; 2) Talc, NVW 100% Microfine, Magnesium Silicate compatible with metals; 3) Pigment: NVW 100%; 96.0% Titanium Dioxide, 4.0% Carbon Black compatible with metals; 4) Melamine resin, NVW 84%, Polymeric, Solvent Butanol; 5) Zinc Cyanamide NVW 100%, Soluble Salt Contaminant-Free, Wayne Pigments; 6) Nickel Cyanamide NVW 100%, Soluble Salt Contaminant-Free; Wayne Pigments; 7) Cobalt Bis-cyanamide NVW 100%, Soluble Salt Contaminant-Free; Wayne Pigments; 8) Zinc Nickel dicyanamide NVW 100%, Soluble Salt Contaminant-Free; Wayne Pigments; 9) Zinc Cobalt dicyanamide NVW 100%; Soluble Salt Contaminant-Free; Wayne Pigments; 10) Lead Zinc Cyanamide, Soluble Salt Contaminant-Free; Wayne Pigments.

The non-aqueous mirror backing system of Table 1A was evaluated after 20% salt spray exposure for 150-300 hours respectively. The soluble salt contaminant-free antioxidant pigments performed well as inhibitors against corrosion of the silver/copper layers and ultimately blocked metal decomposition. In the test, the Lead Zinc Cyanamide rated the highest in performance and Cobalt Bis-cyanamide second in corrosion preventive activity.

The aqueous mirror backing composition of Table 1B was evaluated after 20% salt spray exposure for 150-300 hours, respectively. The soluble salt contaminant-free antioxidant pigments performed as inhibitors against corrosion of the silver/copper layer to result in blocking of the corrosive decomposition of the metals. Because of the water soluble compatible nature of the soluble salt contaminant-free pigments, an additional performance feature was observed in relation to wet chemical plating of silver and copper metals in an aqueous state. This aqueous plating application provides ideal conditions for aqueous coatings which in turn utilizes an amine as in the metal application process, thus enabling the coating to "bite" the metal. Therefore, compositions which contain a high level of zinc cyanamide, up to 9% on total formula, resulted in good anti-corrosion protection. Additionally, when zinc cyanamide is doped at a 2-50% level with nickel bis-cyanamide, cobalt bis-cyanamide, or lead cyanamide, the corrosion retarding performance of the pigment system was enhanced, and a synergistic effect was observed.

The invention has been described herein with reference to preferred embodiments. However, as obvious variations thereon will become apparent to those skilled in the art, the invention is not to be considered as limited thereto.

What is claimed is:

1. A coating composition useful as a durable and long term protective coating for thin metal films which comprises the combination of:
   (a) an organic resin polymer selected from the group consisting of alkyd resins, acrylic resins, acrylic modified alkyd resins, polyurethane oils, vinyl halide polymers, vinyl halide copolymers, non-oil based urethane, and phenol-formaldehyde resins contained in aqueous or non-aqueous medium; and
   (b) an anti-corrosion amount of a substantially soluble salt-free antioxidant scavenger pigment comprising a cyanamide compound of a metal, said cyanamide compound of said metal containing no more than about 0.5% by weight of said soluble salts and wherein said metal is selected from the group consisting of zinc, nickel, cobalt, lead, mixtures thereof, and blends.

2. A composition according to claim 1, wherein the pigment comprises complex salts of cyanamide with at least two metals.

3. A composition according of claim 1, wherein the pigment comprises a metal complexed with at least two equivalents of cyanamides.

4. A composition according to claim 1, wherein the metal is an acid or neutral zinc cyanamide.

5. A composition according of claim 1, wherein about 3 to 65% by weight of the pigment is contained in the resin polymer.

6. A coating composition useful as a durable and long term protective coating for thin metal films, which comprises the combination of:
   (a) an organic resin polymer selected from the group consisting of alkyd resins, acrylic resins, acrylic modified alkyd resins, polyurethane oils, vinyl halide polymers, vinyl halide copolymers, non-oil based urethane, and phenol-formaldehyde resins;
   (b) a solvent; and
   (c) an anti-corrosion amount of a substantially soluble salt-free antioxidant scavenger pigment comprising a cyanamide compound of a metal, said cyanamide compound of said metal containing no more than about 0.5% by eight of said soluble salts and said cyanamide being complexed with at least two metal equivalents and wherein said metal is selected from the group consisting of zinc, nickel, cobalt, lead, mixtures thereof an blends.

7. A composition according to claim 6, wherein the pigment comprises a metal complexed with at least two equivalents of cyanamides.

8. A coating composition useful as a durable and long term protective coating for thin metal films which comprises the combination of:
   (a) an organic resin polymer selected from the group consisting of alkyd resins, acrylic resins, acrylic modified alkyd resins, polyurethane oils, vinyl halide polymers, vinyl halide copolymers, non-oil based urethane, and phenol-formaldehyde resins;
   (b) a solvent;
   (c) water; and
   (d) an anti-corrosion amount of substantially soluble salt-free antioxidant scavenger pigment comprising a cyanamide compound of a metal, said cyanamide compound of said metal containing no more than about 0.5% by weight of soluble salts, and wherein said metal is selected from the group consisting of zinc, nickel, cobalt, lead, mixtures thereof, and blends.

9. A composition according to claim 8 wherein the pigment comprises a metal complexed with at least two equivalents of cyanamides.

* * * * *